(12) United States Patent
Lopes Batista et al.

(10) Patent No.: US 10,264,592 B2
(45) Date of Patent: Apr. 16, 2019

(54) METHOD AND RADIO NETWORK NODE FOR SCHEDULING OF WIRELESS DEVICES IN A CELLULAR NETWORK

(71) Applicant: Telefonaktiebolaget LM Ericsson (publ), Stockholm (SE)

(72) Inventors: Rodrigo Lopes Batista, Fortaleza (BR); Francisco Rodrigo Porto Cavalcanti, Fortaleza (BR); Carlos F. M. Silva, Fortaleza (BR); Tarcisio F. Maciel, Fortaleza (BR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 266 days.

(21) Appl. No.: 15/304,965

(22) PCT Filed: Apr. 30, 2014

(86) PCT No.: PCT/SE2014/050537
§ 371 (c)(1),
(2) Date: Oct. 18, 2016

(87) PCT Pub. No.: WO2015/167379
PCT Pub. Date: Nov. 5, 2015

(65) Prior Publication Data
US 2017/0188381 A1 Jun. 29, 2017

(51) Int. Cl.
*H04W 4/00* (2018.01)
*H04W 72/12* (2009.01)
(Continued)

(52) U.S. Cl.
CPC ....... *H04W 72/1231* (2013.01); *H04W 8/005* (2013.01); *H04W 72/082* (2013.01); *H04W 76/14* (2018.02); *H04W 88/02* (2013.01)

(58) Field of Classification Search
CPC ....... H04W 72/08; H04W 72/12; H04W 8/00; H04W 72/082; H04W 72/1231; H04W 8/005; H04W 88/02
See application file for complete search history.

(56) References Cited

U.S. PATENT DOCUMENTS

2008/0076407 A1\* 3/2008 Shitara ................. H04L 5/0007
455/424
2010/0041407 A1\* 2/2010 Caire .................... H04W 16/28
455/446

(Continued)

OTHER PUBLICATIONS

"InterferenceAvoidance Mechanisms in the Hybrid Cellular and Device-to-Device Systems", IEEE, 2009.\*

(Continued)

*Primary Examiner* — Yemane Mesfin
*Assistant Examiner* — Abdelillah Elmejjarmi
(74) *Attorney, Agent, or Firm* — Sage Patent Group

(57) ABSTRACT

A method and a radio network node for scheduling wireless devices. The node assigns, to each wireless device, a D2D pair out of the D2D pairs based on spatial compatibilities for each of the D2D pairs with respect to each wireless device. The node estimates, for each wireless device and the assigned D2D pair, a first respective throughput for cellular communication and D2D communication, and estimates, for each wireless device, a second respective throughput for only cellular communication. The node schedules one or more of the wireless devices of the cellular network based on the first and second respective throughputs. Each of the wireless devices is scheduled for cellular communication together with the D2D communication of the assigned D2D pair when the first respective throughput exceeds the second respective throughput, or for only cellular communication when the first respective throughput is below the second respective throughput.

13 Claims, 4 Drawing Sheets

(51) Int. Cl.
*H04W 8/00* (2009.01)
*H04W 72/08* (2009.01)
*H04W 88/02* (2009.01)
*H04W 76/14* (2018.01)

(56) References Cited

U.S. PATENT DOCUMENTS

| | | |
|---|---|---|
| 2010/0240312 A1 | 9/2010 | Peng et al. |
| 2013/0288608 A1 | 10/2013 | Fwu et al. |
| 2015/0312915 A1* | 10/2015 | Li .................. H04W 24/10 |
| | | 455/452.1 |
| 2017/0027010 A1* | 1/2017 | Gattami ................ H04L 1/20 |

OTHER PUBLICATIONS

International Search Report and Written Opinion dated Jan. 28, 2015 for International Application Serial No. PCT/SE2014/050537, International Filing Date—Apr. 30, 2014 consisting of 10-pages.
Tao Peng et al., "Interference Avoidance Mechanisms in the Hybrid Cellular and Device-to-Device Systems," Published in: 2009 Proceedings of 20th International Symposium on Personal, Indoor and Mobile Radio Communications, pp. 617-621, Date of Conference: Sep. 13-16, 2009 consisting of 5-pages.

\* cited by examiner

METHOD AND RADIO NETWORK NODE FOR SCHEDULING OF WIRELESS DEVICES IN A CELLULAR NETWORK

CROSS-REFERENCE TO RELATED APPLICATIONS

This application is a Submission Under 35 U.S.C. § 371 U.S. National Stage Patent Application of International Application Number: PCT/SE2014/050537, filed Apr. 30, 2014 entitled "METHOD AND RADIO NETWORK NODE FOR SCHEDULING OF WIRELESS DEVICES IN A CELLULAR NETWORK," the entirety of which incorporated herein by reference.

TECHNICAL FIELD

Embodiments herein relate to wireless communication systems, such as cellular networks. In particular, a method and a radio network node for scheduling of wireless devices of a cellular network are disclosed. A corresponding computer program and a carrier therefor are also disclosed.

BACKGROUND

Device-to-Device (D2D) communications as an underlay to a cellular network have been proposed as a means to take advantage of the proximity of communicating devices and at the same time to allow devices to operate in a controlled interference environment. Typically, such D2D communication shares radio resources with the cellular network. As an example, some radio resources of the cellular network's uplink resources may be reserved for D2D communication. Allocating dedicated radio resources for D2D communication is a less likely alternative as radio resources in general are scarce and dynamic sharing between services utilising D2D communication and services utilising cellular communication is more flexible. In order to achieve the above mentioned controlled interference environment, a solution is to make User Equipments (UEs), involved in the D2D communication, aware of uplink (UL) subframe timing of the cellular network. The cellular network is then configured to schedule the D2D communication to occur in the UL radio resources of the cellular network. This kind of scheduling of the D2D communication is referred to as network assisted scheduling of D2D communication in this disclosure.

D2D communication leads to increased utilization of the radio resources and an intelligent spatial reuse of radio resources is required in order to offload the cellular network and to improve capacity and/or Quality of Service (QoS) levels of the cellular network. Transmissions of the D2D communication typically have lower power than transmissions of cellular communication. The D2D communication may be said to be a direct communication between devices in comparison to cellular communication since transmissions of the D2D communication do not pass via a base station as with the cellular communication between devices. It shall here be said that two UEs in D2D communication with each other are referred to as a D2D pair.

However, transmissions conveyed to cellular and D2D UEs on a same frequency resource are coupled by co-channel interference. The co-channel interference can be adequately estimated in a cell by a network-assisted scheduling policy for D2D communications.

In this context, several studies for finding an efficient D2D network underlying the cellular network as a means to improve utilization of radio resources with a minimal impact on cellular communications have been made. In some distance-based studies in the literature, it has been shown that efficient sharing of the radio resources depends on the distance between D2D users and on their positions with respect to cellular UEs. D2D users refers to two UEs configured for D2D communication. A cellular UE refers here to a UE that is configured for cellular communication via a radio base station. The following studies may be mentioned as examples: K. Doppler, R. Mika, C. Wijting, C. Ribeiro, and K. Hugl, "Device-to-Device Communication as an Underlay to LTE-Advanced Networks", Institute of Electrical and Electronics Engineers (IEEE) Communications Magazine, vol. 47, no. 12, pp. 42-49, December 2009, G. Fodor, E. Dahlman, G. Mildh, S. Parkvall, N. Reider, G. Miklo, and Z. Turanyi, "Design Aspects of Network Assisted Device-to-Device Communications," IEEE Communications Magazine, vol. 50, no. 3, pp. 170-177, March 2012, and M. Belleschi, G. Fodor, and A. Abrardo, "Performance Analysis of a Distributed Resource Allocation Scheme for D2D Communications," in IEEE Workshop on Machine-to-Machine Communications, Houston, EUA, December 2011.

In the second of the above mentioned studies, it has been shown that the best overall capacity depends mainly on the position of a D2D receiver, e.g. a UE receiving a D2D communication, relative to a cellular UE when reusing Downlink (DL) resources, and similarly relative to the Evolved Node B (eNB) when reusing Uplink (UL) resources.

Cellular communications occurring near an eNB and D2D communications occurring near the cell-edge provides the most favorable scenario for D2D communications according to another study, namely in R. L. Batista, C. F. M. e Silva, J. M. B. da Silva Jr., T. F. Maciel, and F. R. P. Cavalcanti, "Network-Assisted Device-to-Device Communications," GTEL-UFC-Ericsson UFC.33, Tech. Rep., August 2013, Second Technical Report.

In "Device-to-Device Communication as an Underlay to LTE-Advanced Networks" as mentioned above, an analysis demonstrates the feasibility of the coexistence of both communication types and shows that D2D communications bring benefits in interference-limited local area scenarios. Thus, the potential benefits of D2D communications are strongly constrained by the network topology.

While some of the above mentioned studies have pointed out that the overall capacity of the cellular network supporting D2D communications always outperforms the conventional cellular network, when cellular spectrum resources are reused by D2D communications in so called favorable scenarios, other studies have proposed solutions to extend the range of situations for which D2D is useful through Radio Resource Management (RRM) schemes as mode selection, resource assignment and power allocation. Reference is made to e.g. M. Zulhasnine, C. Huang, and A. Srinivasan, "Efficient resource allocation for device-to-device communication underlaying LTE network", in Wireless and Mobile Computing, Networking and Communications (WiMob), 2010 IEEE 6th International Conference on, 2010, pp. 368-375, and F. Wang, L. Song, Z. Han, Q. Zhao, and X. Wang, "Joint Scheduling and Resource Allocation for Device-to-Device underlay Communication", in Proceedings of the IEEE Wireless Communications and Networking Conference (WCNC), 2013, pp. 134-139.

Therefore, RRM techniques applying efficient interference coordination becomes a major issue in cellular networks supporting D2D communications.

In general, most of the proposed schemes for resource assignment for D2D communications considered a preselected cellular link such that the scheduling in the cellular network runs independently of establishment of D2D connections.

In "Joint Scheduling and Resource Allocation for Device-to-Device underlay Communication" mentioned directly above, the available channels are firstly allocated to cellular UEs while the D2D pairs form a priority queue for each channel. Then, the eNB sequentially selects the D2D pair which is the first D2D pair in the priority queue and sets the transmit power for each frequency resource. It means that the allocation of channels to cellular UEs is assumed to be fixed while channels are allocated among D2D pairs according to the priority queue. Disadvantageously, multiuser diversity may not be efficiently exploited.

Indeed, it is not possible to ensure that a group including a primary cellular UE and one or more secondary D2D pairs is the most spatially compatible group in each frequency-time resource through a "greedy" approach. Perhaps, all available D2D pairs are spatially incompatible with that primary cellular UE, that is, the primary UE is very close to all available D2D pairs, while a different cellular UE could have better conditions to share the same resource and enable a D2D communication which would provide an increased total throughput. In fact, the choice of a former cellular UE to be the head of a greedy search limits the exploitation of the overall multiuser diversity into a cell, what might also limit the maximum possible throughput gains.

As prior works have focused on finding the most spatial compatible D2D pairs with respect to a primary cellular UE using a greedy approach, they have neglected the total benefits of the multiuser diversity while it is well known that the system capacity can be improved by accurately exploiting such diversity. Reference is made to M. Belleschi, G. Fodor, and A. Abrardo, "Performance Analysis of a Distributed Resource Allocation Scheme for D2D Communications", in IEEE Workshop on Machine-to-Machine Communications, Houston, EUA, December 2011.

The joint scheduling of cellular and D2D users for shared resources appears in this context as a promising RRM technique that allows high gains with D2D communications and improves the system capacity. However, for scenarios with many cellular UEs and D2D pairs there will be many possible assignments of D2D pairs to each cellular UE as well as many combinations with respect to the number of D2D pairs that could be jointly assigned with each cellular UE and, therefore, the general problem of scheduling a variable number of cellular UEs and D2D pairs in a multi-cell scenario becomes a hard-to-solve optimization problem.

Again in "Performance Analysis of a Distributed Resource Allocation Scheme for D2D Communications", a heuristic approach achieves performance close to the optimal in terms of spectral efficiency and user fairness through a joint mode selection, resource assignment and power allocation scheme by exploiting multiuser diversity. However, this framework makes an exhaustive search testing all mode selection and resource assignment decisions. Thus, a disadvantage is that a lot of processing is required.

SUMMARY

An object may be to improve performance of the above mentioned cellular network in which radio resources are shared between wireless devices, such as UEs, and D2D pairs.

According to a first aspect, the object is achieved by a method, performed by a radio network node, for scheduling of wireless devices of a cellular network, wherein at least some of the wireless devices form D2D pairs, wherein wireless devices of each D2D pair are operable for direct communication utilizing radio resources that are commonly shared with the cellular network. The radio network node assigns, to each wireless device, a D2D pair out of the D2D pairs based on spatial compatibilities for each of the D2D pairs with respect to said each wireless device. Moreover, the radio network node estimates, for each wireless device and the assigned D2D pair, a first respective throughput for cellular communication and D2D communication. Additionally, the radio network node estimates, for each wireless device, a second respective throughput for only cellular communication. The radio network node also schedules one or more of the wireless devices based on the first and second respective throughputs, wherein each of the one or more of the wireless devices is scheduled for cellular communication together with the D2D communication of the assigned D2D pair when the first respective throughput exceeds the second respective throughput, and for only cellular communication when the first respective throughput is below the second respective throughput.

According to a second aspect, the object is achieved by a radio network node configured to schedule wireless devices of a cellular network, wherein at least some of the wireless devices form D2D pairs, wherein wireless devices of each D2D pair are operable for direct communication utilizing radio resources that are commonly shared with the cellular network. The radio network node is configured to assign, to each wireless device, a D2D pair out of the D2D pairs based on spatial compatibilities for each of the D2D pairs with respect to said each wireless device. The radio network node is further configured to estimate, for each wireless device and the assigned D2D pair, a first respective throughput for cellular communication and D2D communication, and to estimate, for each wireless device, a second respective throughput for only cellular communication. The radio network node is also configured to schedule one or more of the wireless devices based on the first and second respective throughputs, wherein each of the one or more of the wireless devices is scheduled for cellular communication together with the D2D communication of the assigned D2D pair when the first respective throughput exceeds the second respective throughput, and for only cellular communication when the first respective throughput is below the second respective throughput.

According to further aspects, the object is achieved by a computer program and a carrier for the computer program corresponding to the aspects above.

Some embodiments may be summarized as follows.

Firstly, e.g. before the radio network node has scheduled according to any known scheduling procedure the one or more wireless devices, the radio network node assigns, to each wireless device, a D2D pair out of the D2D pairs based on spatial compatibilities for each of the D2D pairs with respect to said each wireless device. A spatial compatibility may be a measure of link quality between each of the D2D pairs and said each wireless device. As a concrete example, the measure of link quality may be expressed in terms of distance. For this example, a D2D pair, out of the D2D pairs, that is most distant to said each wireless device is assigned to said each wireless device.

Secondly, the radio network node estimates, for each wireless device and the assigned D2D pair, a first respective throughput for cellular communication and D2D communication. Accordingly, the radio network node may take into account a joint throughput including both cellular and D2D communication when assessing which wireless device(s) to schedule.

Hence, the radio network node schedules one or more of the wireless devices of the cellular network based on the first and second respective throughputs. This may mean that the radio network node schedules one or more wireless device for cellular communication while evaluating a possible impact of scheduling said one or more wireless devices together the D2D communication of the assigned D2D pair. The possible impact may be evaluated in terms of throughput as given by the first and second respective throughputs, where higher throughput is more favorable.

Therefore, said one or more wireless devices which is to be scheduled is selected based on throughput for cellular communication combined with D2D communication of the assigned D2D pair, i.e. the first respective throughput, as well as throughput for cellular communication alone, i.e. the second respective throughput.

Thus, in order to effectively perform a mode selection, in which it is selected whether said one or more wireless devices is to be scheduled with or without D2D communication of the assigned D2D pair, each of the one or more of the wireless devices are scheduled for cellular communication together with the D2D communication of the assigned D2D pair when the first respective throughput exceeds the second respective throughput, or for only cellular communication when the first respective throughput is below the second respective throughput. It shall here be noted that the mode selection according to prior art is typically performed based on identification of so called favorable scenarios, e.g. near cell-edge, as mentioned in the background section. In contrast thereto, the embodiments herein may perform an implicit mode selection based on the estimated first and second respective throughputs as part of a joint opportunistic scheduling procedure.

Thanks to that the radio network node assigns a D2D pair to each wireless device, the estimation of the first throughput is performed only for a reduced subset of D2D pairs, i.e. the subset is reduced compared to all D2D pairs as in the exhaustive search mentioned in the background section. Therefore, processing during scheduling is reduced. An advantage with reduced processing is that timing requirements for scheduling, e.g. how often scheduling is to be performed, may more easily be met. This means that the embodiments herein provide a low-complexity solution for a very complex joint scheduling problem for which previous studies have provided complex solutions, such as in "Performance Analysis of a Distributed Resource Allocation Scheme for D2D Communications" mentioned above.

Also, multiuser diversity available for scheduling is increased compared with known solutions, since a D2D pair is assigned to each wireless device, configured for cellular communication, before scheduling thereof.

The joint opportunistic scheduling prioritizes wireless devices, configured to cellular communication, which are suitable, in terms of the first respective throughput relative the second respective throughput, for sharing radio resources with D2D communications. However, the embodiments herein also have flexibility in that only cellular communication may be chosen when the second respective throughput exceeds the first respective throughput. Thus, the joint opportunistic scheduling provides an adaptive frequency reuse scheme dependent on spatial compatibility among wireless devices and D2D pairs.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
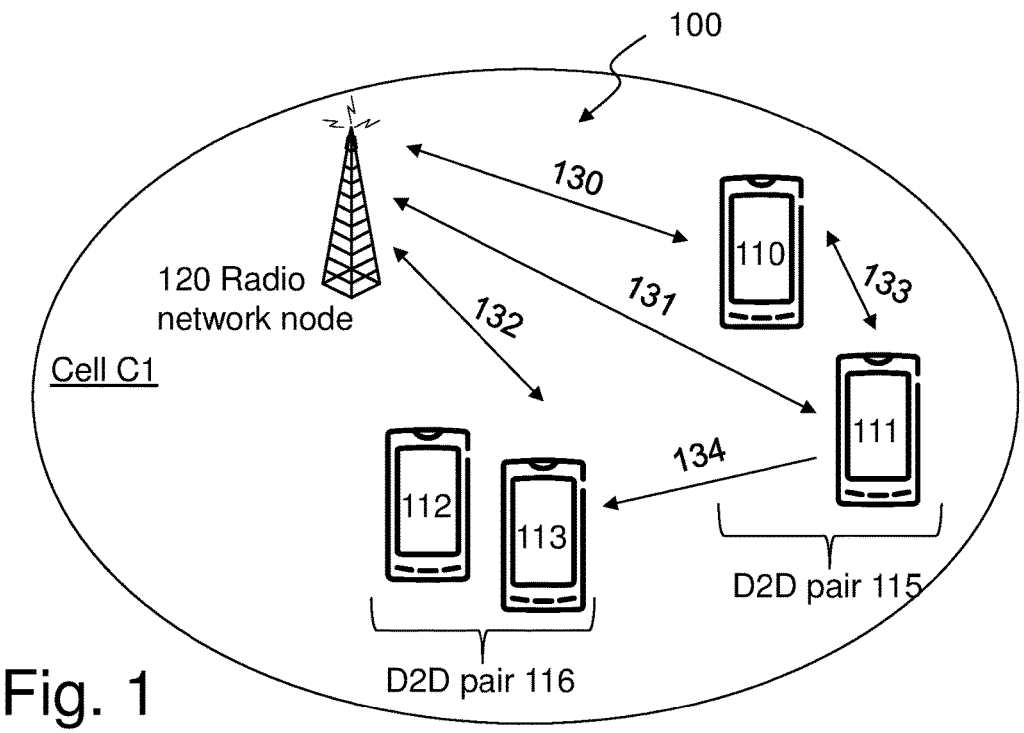
FIG. 1 is a schematic overview of an exemplifying cellular network in which embodiments herein may be implemented.

Throughout the following description similar reference numerals have been used to denote similar elements, units, modules, circuits, nodes, parts, items or particular features, when applicable. In the Figures, optional features that appear in some embodiments are indicated by dashed lines.

FIG. 1 depicts an exemplifying cellular network 100 in which embodiments herein may be implemented. In this example, the cellular network 100 is a Long Term Evolution (LTE) network. In other examples, the wireless communication network 100 may be any cellular or wireless communication system, such as a Global System for Mobile Communications (GSM), Universal Mobile Telecommunication System (UMTS) and Worldwide Interoperability for Microwave Access (WiMAX) allowing a layer of D2D communications or the like.

The cellular network 100 may be said to comprise wireless devices 110, 111, 112, 113. This means that the wireless devices 110, 111, 112, 113 are present in the cellular network 100.

At least some of the wireless devices 110, 111, 112, 113 form D2D pairs 115, 116. Wireless devices 110, 111, 112, 113 of each D2D pair 115, 116 are operable for direct communication utilizing radio resources that are commonly shared with the cellular network 100. Therefore, the wireless devices 110, 111, 112, 113 of each D2D pair 115, 116 may be said to be operated in a D2D mode.

Moreover, some wireless devices of the wireless devices 110, 111, 112, 113 in the cellular network 100 may be said to be operated in a cellular mode. This may mean that in addition to, and/or as an alternative to, the D2D mode these wireless devices are operated in cellular mode.

In some examples, a respective one of the wireless devices 110, 111, 112, 113 may be referred to as a first wireless device 110, a second wireless device 111, a third wireless device 112 and a fourth wireless device 113.

Furthermore, a radio network node 120 is shown in FIG. 1. The cellular network 100 may comprise the radio network node 120. In some examples, one or more of wireless device 110, 111, 112, 113 are served by the radio network node 120. The radio network node 120 may operate a cell C1, in which the wireless devices 110, 111, 112, 113 may be located.

The radio network node 120 may communicate 130 with the first wireless device 110. This communication may include user transmissions and/or control transmissions. The user transmissions may include user data, payload data, content data etc. The control transmissions may include control information relating to e.g. scheduling, authentication, mobility etc. The user transmissions are only relevant in case the first wireless device is in a cellular mode.

Similarly, the radio network node 120 may communicate 131, 132 with the second and third wireless devices 111, 112. These communications may include user transmissions and/or control transmissions. The user transmissions may include user data, payload data, content data etc. The control transmissions may include control information relating to e.g. scheduling, authentication, mobility etc. The user transmissions are only relevant in case the second and/or third wireless device 111, 112 is in a respective cellular mode.

The first and second wireless device 110, 111 may operate in D2D mode, as D2D pair 115, while transmitting 133 D2D communications between each other. Moreover, the transmitting of the D2D communication may cause interference 134, e.g. so called D2D leakage, towards D2D pair 116.

As used herein, the term "radio network node" may refer to an evolved Node B (eNB), a Radio Network Controller (RNC), a Radio Base Station (RBS), a control node controlling one or more Remote Radio Units (RRUs), an access point or the like.

As used herein, the term "wireless device" may refer to a user equipment, a machine-to-machine (M2M) device, a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. The sensor may be any kind of weather sensor, such as wind, temperature, air pressure, humidity etc. As further examples, the sensor may be a light sensor, an electronic or electric switch, a microphone, a loudspeaker, a camera sensor etc. The term "user" may indirectly refer to the wireless device.

According to some embodiments herein, joint scheduling of wireless devices in cellular mode and D2D pairs is performed through an opportunistic exploitation of multiuser diversity. According to prior art scheduling of D2D communications underlying a cellular network is performed based on a prior scheduling of the wireless device in cellular mode, referred to as cellular wireless device or cellular UE herein. In contrast thereto, it is proposed according to some embodiments herein to perform a method for scheduling of wireless devices, in cellular mode as well as in D2D mode, simultaneously while taking into account a total throughput including throughput of cellular communication as well as throughput of D2D communication in addition to taking into account a throughput of cellular communication only as in prior art. This will be described in more detail e.g. with reference to FIG. 4 below. Thus, based on a principle of a multiuser scheduling, the total throughput in the cell C1 is increased opportunistically without testing all combinations of cellular wireless devices and D2D pairs.

Embodiments herein include at least two actions:

1-layer assignment: Using a metric to measure a spatial compatibility among wireless devices and D2D pairs, it assigns the most spatial compatible D2D pair to each wireless device.

Opportunistic scheduling: Considering the assignments provided by the previous step, the opportunistic scheduling may be based on a priority which may relate to the greater of the total throughput of cellular and D2D communications and the throughput for cellular communication only. Thus, depending on the priority cellular communication only or combined cellular and D2D communication may be chosen. With the priority, the radio network node 120 is able to jointly and opportunistically schedule the group, comprising a cellular wireless device and its assigned D2D pair, which group provides an increased throughput, or even maximized throughput, in each cell, Physical Resource Block (PRB) and Transmission Time Interval (TTI).

As mentioned, the opportunistic scheduling decides which is better; i.e. the joint scheduling of a group of a cellular wireless device and a D2D pair, or the scheduling of only one cellular wireless device without sharing the radio resources with a D2D pair, by comparing a modified ratio relating to the total throughput of cellular and D2D communications to the Proportional Fair (PF)-ratio according to prior art. The modified ratio is explained with reference to equation 5 below.

A few exemplifying embodiments further includes:
 a pre-assignment, which reduces the processing complexity of the assignment action by selecting the most, or nearly most, likely groups to be scheduled;
 a pre-scheduling, which reduces the processing complexity of the scheduling action by selecting the most, or nearly most, likely groups to be scheduled;
 a protection action, or protection mechanism, which by increasing the total throughput with interference coordination, avoids the selection of D2D pairs that would highly harm the performance of cellular communication; and
 a Multiple-layer scheduling, which is designed considering the initial choice of a group of a cellular UE and a D2D pair.

These embodiments, and other embodiments, will be described in more detail below with reference to FIG. 4 and in separate sections following the description of FIG. 4.

Figure 2:
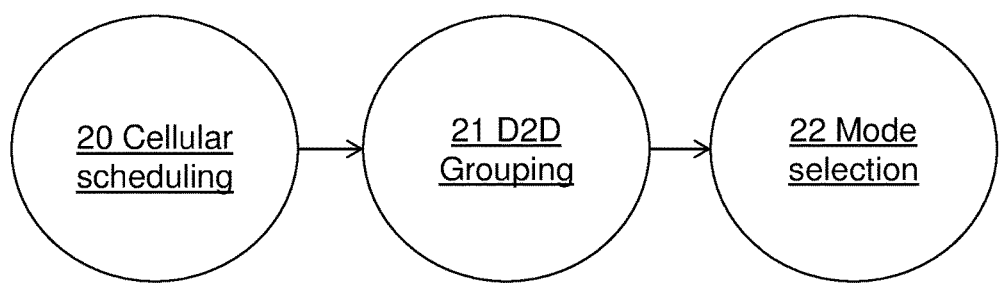
FIG. 2 is a schematic illustration of resource management for scheduling according to prior art.

In order to illustrate an advantage of the embodiments herein, FIG. 2 shows an exemplifying known procedure for scheduling in a cellular network in which radio resources are commonly shared with D2D communication of the D2D pairs as an underlay to the cellular network.

In this exemplifying known procedure, a radio base station, such as the radio network node 120, first performs cellular scheduling 20 to find which wireless device in cellular mode is in turn to obtain radio resources for cellular communication.

Then, the radio base station performs a so called D2D grouping 21. During the D2D grouping 21, the radio base station assigns one or more D2D pairs to the wireless device, which in the preceding paragraph was found to be in turn to obtain radio resources. Thus, it is already decided which wireless device in cellular mode that is to obtain radio resource for cellular transmission. This means that it is not possible to evaluate which wireless device in cellular mode is most suitable to combine with the D2D pairs.

Subsequently to the D2D grouping 21, the radio base station performs so called mode selection 22. Then, the radio base station checks whether or not it is favorable, in terms of e.g. throughput, spectral efficiency or the like, to schedule the wireless device in cellular mode alone or together with the D2D pair assigned to it during the D2D grouping 21.

Figure 3:
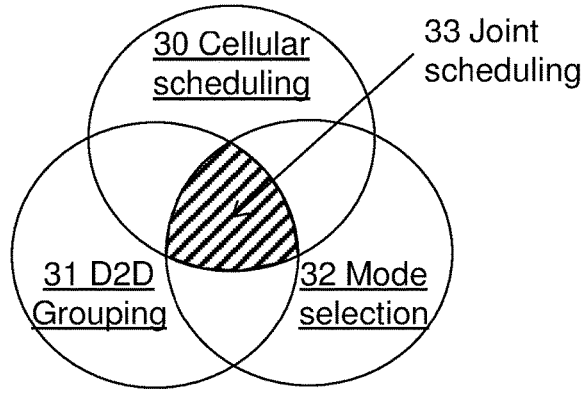
FIG. 3 is a schematic illustration of resource management for scheduling according to embodiments herein.

In contrast to the known procedure illustrated in FIG. 2, FIG. 3 shows a schematic overview of the method according to embodiments herein. Conceptually, a cellular scheduling 30, a D2D grouping 31 and a mode selection 32 are merged together to form a joint scheduling 33 according to embodiments herein. FIG. 3 illustrates that, as opposed to in FIG. 2, the cellular scheduling 30, the D2D grouping 31 and the mode selection 32 are performed jointly by means of a common algorithm illustrated in more detail with reference to e.g. FIG. 4. Therefore, with the embodiments herein, a separate cellular scheduling, a separate D2D grouping for the wireless device identified by the cellular scheduling, and a separate mode selection identified by the cellular scheduling are not distinguishable.

Thus, the joint scheduling 33 may run in an opportunistic manner and may replace three RRM techniques: cellular scheduling, D2D grouping and mode selection, which are illustrated in FIG. 2.

Figure 4:
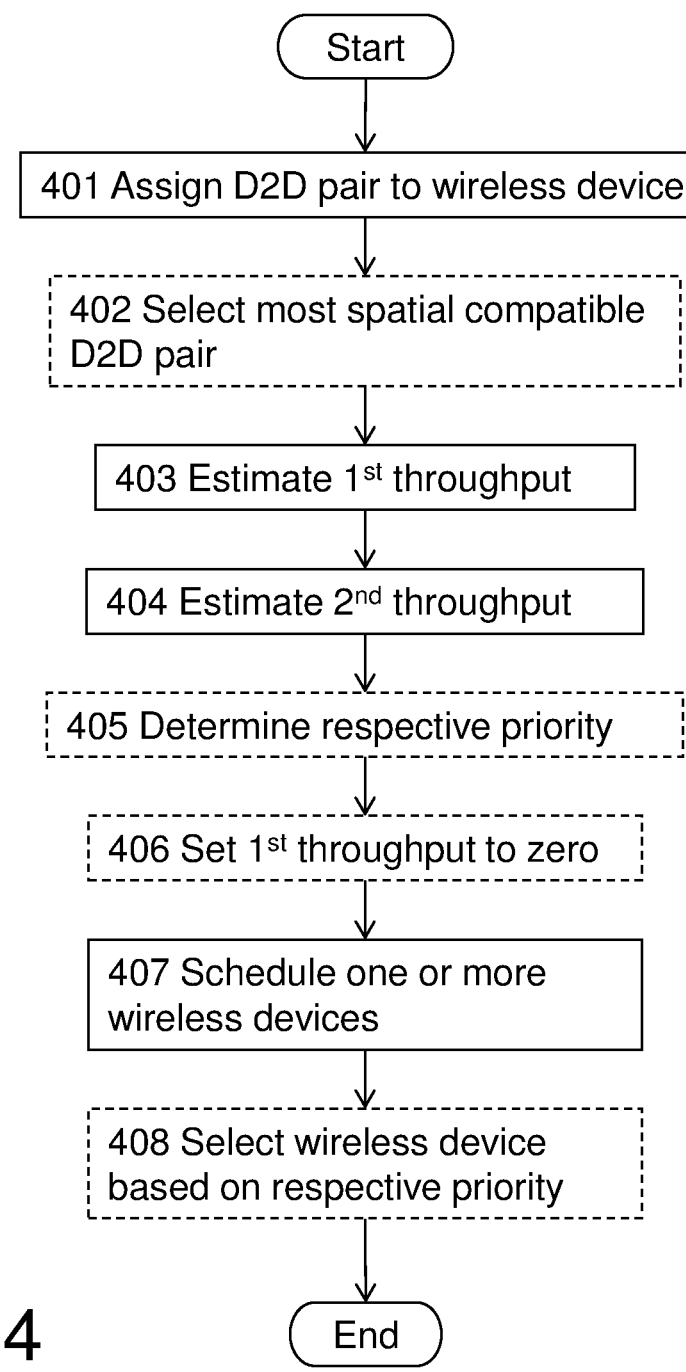
FIGS. 4 and 5 are flowcharts illustrating embodiments of the method in the radio network node.

FIG. 4 illustrates an exemplifying method according to embodiments herein when performed in connection with the cellular network 100 of FIG. 1.

The radio network node 120 performs a method for scheduling of wireless devices 110, 111, 112, 113 of a cellular network 100. As an example, the radio network node 120 schedules the wireless devices 110, 111, 112, 113 for transmission in the cellular network 100.

As mentioned, at least some of the wireless devices 110, 111, 112, 113 form D2D pairs 115, 116, wherein wireless devices 110, 111, 112, 113 of each D2D pair 115, 116 are operable for direct communication utilizing radio resources that are commonly shared with the cellular network 100.

The following actions may be performed in any suitable order.

Action 401

In order to reduce number of wireless devices 110, 111, 112, 113, for which e.g. action 403 and 404 shall be performed, the radio network node 120 assigns, to each wireless device 110, 111, 112, 113, a D2D pair out of the D2D pairs 115, 116 based on spatial compatibilities for each of the D2D pairs 115, 116 with respect to said each wireless device 110, 111, 112, 113.

The spatial compatibility depends on channel conditions of desired and interfering links among the eNB, the cellular device, and the receiver and transmitter of a D2D pair. Thus, the spatial compatibility may be measured in terms of one of more of:

a link quality measure relating to cellular communication and D2D communication;

a level of interference between cellular communication and D2D communication;

a signal-to-interference-and-noise-ratio for cellular and D2D communication;

a signal-to-leakage-ratio for cellular and D2D communication;

a distance between said each wireless device and the respective D2D pairs; and the like.

As an example, the signal-to-interference-and-noise-ratio for cellular and D2D communication may be represented by Reference Signal Received Quality (RSRQ). Typically, RSRQ is determined as the ratio between Reference Signal Received Power (RSRP) and Received Signal Strength Indicator (RSSI). It shall be understood that in other examples signal-to-interference-ratio (SIR) may be used.

As an example, the signal-to-leakage ratio for cellular and D2D communication may also be calculated by using the RSRP and the RSSI measures. The signal part is still given by the RSRP at the desired wireless device. However, the leakage measure is given by the RSRP measured by the receiver in the same cell perceiving the co-channel/intra-cell interference.

The pre-assignment action may be performed according to some embodiments. Thus, the radio network node 120 may assign the respective one of the D2D pairs 115, 116 for only a portion of the wireless devices 110, 111, 112, 113 operated in cellular communication. Expressed differently, the assigning 401 of the respective one of the D2D pairs 115, 116 may be performed only for a portion of the wireless devices 110, 111, 112, 113 operated in cellular communication.

Each of the wireless devices 110, 111, 112, 113 of the portion may have a respective PF-ratio based on the second respective throughput that is greater than any corresponding PF-ratio for any one of the wireless devices 110, 111, 112, 113 which may be excluded from the portion. As an example, this may mean that the portion may include those wireless devices for which each respective PF-ratio is above a threshold value. The threshold value may e.g. be set to a mean value of the respective PF-ratios if it is desired to perform action 401 for about 50% of the wireless devices 110, 111, 112, 113 operated in cellular communication.

Pre-assignment alleviates concerns about expensive processing for scenarios with dense zones of D2D traffic and high loads in terms of wireless devices per cell, e.g. the cell C1. Advantageously, the pre-assignment provides a relatively large gain in terms of reduced processing in action 401, while at the same time requiring a relatively small amount of processing for finding the portion for which action 401 should be performed.

Action 402

This action describes an example of how action 401 may be performed. Therefore, the radio network node 120 may assign a D2D pair to each wireless device 110, 111, 112, 113 by selecting the D2D pair 115, 116 for which a respective spatial compatibility for said each wireless device 110, 111, 112, 113 is among the greatest of the spatial compatibilities to be assigned to said each wireless device 110, 111, 112, 113. Expressed slightly different, the assigning 401 of the D2D pair 115, 116 may comprise selecting 402 the D2D pair 115, 116 for which a respective spatial compatibility for said each wireless device 110, 111, 112, 113 is among the greatest of the spatial compatibilities to be assigned to said each wireless device 110, 111, 112, 113.

Action 403

In order for the radio network node 120 to be able to find out which wireless device to schedule in action 407, the radio network node 120 estimates, for each wireless device 110, 111, 112, 113 and the assigned D2D pair 115, 116, a first respective throughput for cellular communication and D2D communication. The first respective throughput for both cellular communication and D2D communication forms a basis from which the modified PF-ratio may be determined as described in section "Joint scheduling" below.

Action 404

Additionally, also in order for the radio network node 120 to be able to find out which wireless device to schedule in action 407, the radio network node 120 estimates, for each wireless device 110, 111, 112, 113, a second respective throughput for only cellular communication. Action 404 may be performed before, or after, action 403. The second respective throughput for cellular communication, i.e. for cellular communication only, forms a basis from which the PF-ratio, according to prior art, may be determined as described in section "Joint scheduling" below.

Action 405

The radio network node 120 may determine, for each wireless device 110, 111, 112, 113, a respective priority for scheduling of said each wireless device 110, 111, 112, 113 based on the first and second respective throughputs. The respective priority may be used in action 408 below.

The respective priority may be calculated as described in more detail in section "Joint scheduling below".

In some embodiments, referred to as "pre-scheduling embodiments", a respective assignment metric may represent the spatial compatibility for a respective one of the wireless devices 110, 111, 112, 113. Thus, the radio network node 120 may determine the respective priority only for a further portion of groups comprising the wireless devices 110, 111, 112, 113 with their respective assigned D2D pair 115, 116. That is to say, each group may comprise the wireless device and its assigned D2D pair.

Expressed differently, the determining 405 of the respective priority may be performed only for a further portion of groups comprising the wireless devices 110, 111, 112, 113 with their respective assigned D2D pair 115, 116.

The respective assignment metric for each group of the further portion may be greater than any corresponding respective assignment metric for any one of the wireless devices 110, 111, 112, 113 with their respective assigned D2D pair 115, 116, which may be excluded from the further portion.

As an example, this may mean that the further portion may include those groups for which each respective assignment metric is above a threshold value. The threshold value may e.g. be set to a mean value of the respective assignment metrics if it is desired to perform action 405 for about 50% of the groups.

Action 406

In some embodiments, it may be desired to protect the cellular communication. This means that the cellular communication may not be allowed to be severely affected by the D2D communication. Thus, the radio network node 120 may determine the respective priority by setting the first throughput to zero when one minus a ratio between the first respective throughput and the second respective throughput exceed a threshold for protection of the cellular communication. In this manner, it may be ensured that the cellular communication is prioritized when the threshold is exceeded.

Expressed differently, the determining of the respective priority may comprise setting the first throughput to zero when one minus a ratio between the first respective throughput and the second respective throughput exceed a threshold for protection of the cellular communication.

In this manner, the cellular communication, or cellular layer, is protected from interference since an impact of D2D communications on the cellular communications is controlled, e.g. by means of the threshold value.

Action 407

Now that the first and second throughputs have been estimated in action 403 and 404, the radio network node 120 schedules one or more of the wireless devices 110, 111, 112, 113 of the cellular network 100 based on the first and second respective throughputs.

Each of the one or more of the wireless devices 110, 111, 112, 113 is scheduled for cellular communication together with the D2D communication of the assigned D2D pair 115, 116 when the first respective throughput exceeds the second respective throughput, and for only cellular communication when the first respective throughput is below the second respective throughput. Thus, the radio network node 120 may effectively select whether the cellular communication is to be combined with a D2D communication or if the cellular communication is to be scheduled alone, i.e. without sharing radio resources with the D2D communication.

Action 408

When action 405 has been performed, the radio network node 120 may schedule the one or more wireless devices 110, 111, 112, 113 by selecting the one or more wireless devices based on the respective priority for each wireless device 110, 111, 112, 113.

Expressed differently, the scheduling 407 of the one or more wireless devices 110, 111, 112, 113 may comprise selecting 408 the one or more wireless devices 110, 111, 112, 113 based on the respective priority for each wireless device 110, 111, 112, 113.

In some embodiments, one or more of actions 403-408 may be performed for each scheduling instance. Each scheduling instance may relate to one or more of a Transmission Timing Interval (TTI), radio resources comprised in the cellular network 100; a frequency selected for scheduling; and the like. The radio resources comprised in the cellular network 100 may be a group of so called resource blocks, subcarriers or the like.

Moreover, action 401 and/or action 402 may typically be performed less frequent than for each scheduling instance.

This means in case one or more of the actions described above are repeated, regularly or irregularly, there may be an inner repetition loop comprising one or more of actions 403-408.

Thus, as explained above, timing of one or more of actions 403-408 is different from timing of one or more of actions 401-402 in that one or more of actions 403-408 are typically performed more frequent than one or more of actions 401-402.

In some scenarios, there are at least five wireless devices, such as the wireless devices wireless devices 110, 111, 112, 113 and a further wireless device (not shown). In this scenarios, a first most spatially compatible D2D pair 116 may comprise e.g. the wireless devices 112, 113 and a second less spatially compatible D2D pair may comprise e.g. the wireless devices 110, 111. The further wireless device may be operated in cellular mode and subject to be scheduled. In such scenario, it is particularly advantageous to apply the method according to embodiments herein since the method chooses the most spatially (or almost most spatially) compatible D2D pair (out of at least two pairs) to be scheduled with the cellular UE. The method does thus not need to evaluate a scheduling of the cellular wireless device together with the other less spatially compatible D2D pair.

Figure 5:
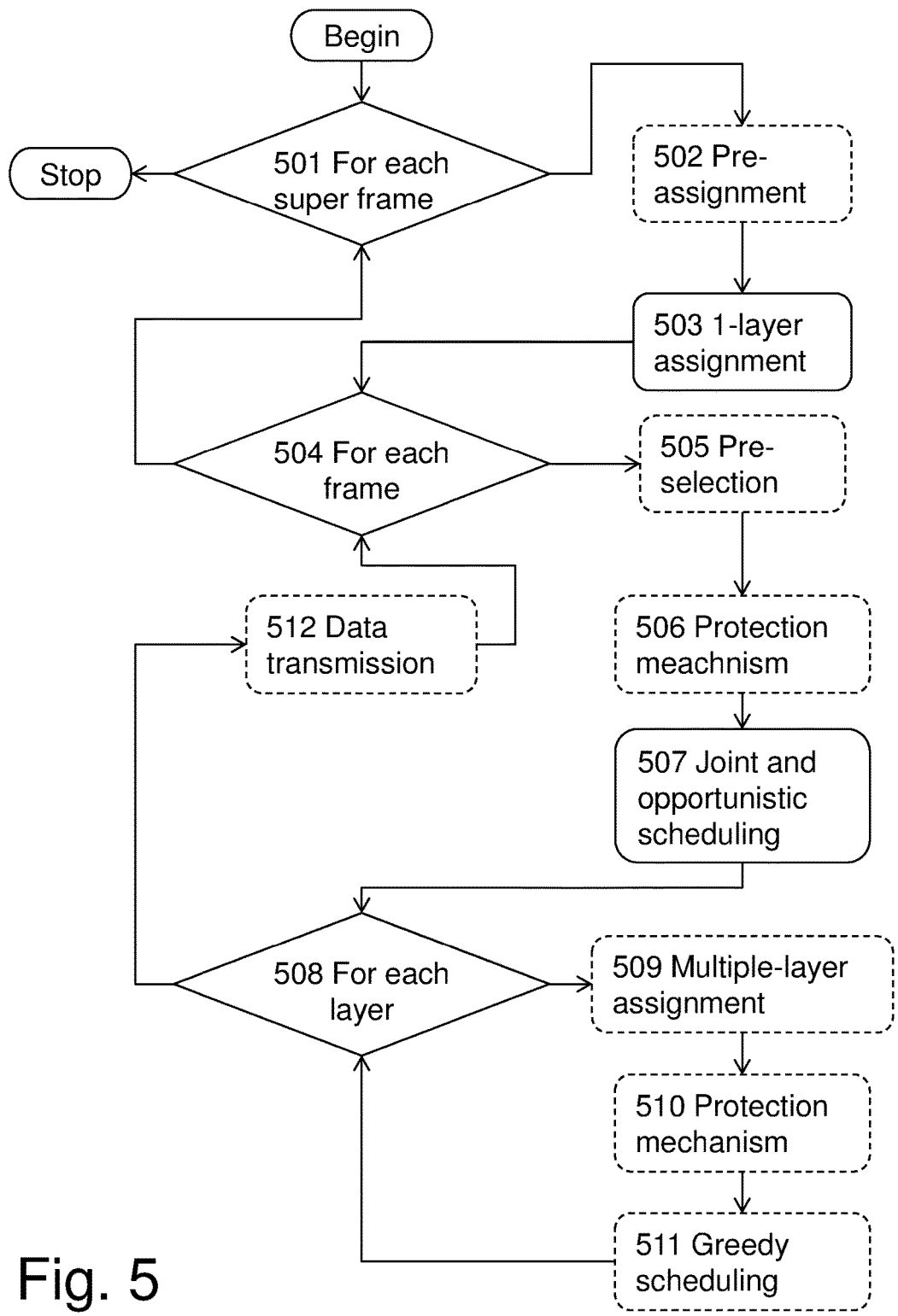

In a particular embodiment according to FIG. 5, the cellular network 100 is still exemplified by a LTE network. This particular embodiment is also performed in connection with the cellular network 100 of FIG. 1. At initiation, i.e. before action 501, the radio network node 120 is just about to assign downlink radio resources to one or more wireless devices.

The following action may be performed in any suitable order.

In an action 501, the radio network node 120 determines whether to perform actions 502 and 503 depending on e.g. time elapsed since last time these actions were performed. In comparison to the flowchart of FIG. 4, actions 401 and 402 may be performed after action 501.

Thus, e.g. regularly like every second to tens of seconds and/or at arrival of new wireless devices to the cell C1:

Each wireless device measures the RSRP (Reference Signal Received Power) on the RS (Reference Signal) of its cell (cellular link).

Each wireless device measures the RSRP on RSs of all active D2D pairs within its cell.

Regularly according to CSI (Channel State Information) reporting configuration, in the order of 20-200 ms:

The wireless devices report all measurements to the radio network node 120.

One assignment instance, including action 502 and/or 503, is started for each cell.

In action 502, a given number of wireless devices may be selected by the pre-assignment step, using for example the standard PF-ratio.

In action 503, the eNB assigns each active D2D pair to a wireless device by an assignment metric as in some embodiments mentioned above. This action may be similar to action 401.

In an action 504, the radio network node 120 starts an opportunistic scheduling instance for each TTI, wherein the opportunistic scheduling instance includes one or more of actions 505-507, which may be similar to actions 403-408.

In an action 505, a given number of UEs and of groups with a wireless device and a D2D pair may be selected by the pre-scheduling step, using for example the assignment metric values, as described above.

Instantaneous data rate, as an example of the first and second respective throughputs, are computed for each wireless device in Cell mode, i.e. cellular mode, and group in Cell+D2D mode, i.e. cellular communication together with D2D communication.

The protection mechanism, in action 506, may nullify the total throughput of a group in Cell+D2D mode when the impact on performance of the cellular wireless device is high, e.g. above a threshold.

The joint scheduling metric, in action 507, is applied for the wireless devices in Cell mode and group in Cell+D2D mode as defined in Equation (6) below. Then, the wireless device or group with the highest, or among the highest, priority is scheduled. This action may be similar to at least parts of action 407.

Scheduling of multiple D2D pairs, in action 511, may be performed through a greedy search considering the UE obtained in Equation (6) below as the primary UE.

1-layer Assignment

This action, referred to as action 401 and action 503 above, is designed to avoid increasing the scheduling complexity by limiting the number of throughput calculations on the joint scheduling step to the most spatial compatible D2D pair for each cellular wireless device. It exploits the spatial compatibility of each possible group of a cellular wireless device and a D2D pair by using an assignment metric to assign the most likely group to be scheduled with each cellular wireless device. Herein, one layer means that each group processed by the assignment step contains only one D2D pair, two layers means that all D2D pairs are combined in groups with two D2D pairs for each cellular wireless device and so on.

Herein, any assignment metric $\varphi_{u,n}$ measuring the spatial compatibility among each cellular wireless device u and D2D pair n can be employed in the assignment step. Thus, a matrix whose elements are given by the assignment metric calculated for all J active cellular wireless devices and $N_1$ possible groups of one D2D pair (1-layer) present in a cell can be written as follows $$\Phi = \begin{bmatrix} \varphi_{1,1} & \varphi_{1,2} & \cdots & \varphi_{1,N_1} \\ \varphi_{2,1} & \varphi_{2,2} & \cdots & \varphi_{2,N_1} \\ \vdots & \vdots & \ddots & \vdots \\ \varphi_{J,1} & \varphi_{J,2} & \cdots & \varphi_{J,N_1} \end{bmatrix}. \quad \text{(Equation 1)}$$

For each wireless device u, the most spatially compatible pair nu is given by $n_u = \arg\max \varphi_{u,n}$. The model described above considers that all $N_1$ D2D pairs available in the cell were discovered by all J active cellular wireless devices, but this model is easily extended for the case in which some D2D pairs were not discovered in the neighbors list of each wireless device, zero values are written in the respective elements in the matrix above.

In order to avoid increasing the complexity on assignment processing and overhead on the reporting of channel link measures, the assignment metric should be as simple as possible. Thus, the assignment step may be dealt on a slow basis, e.g. in a range of seconds, and also once for all PRBs. As it was said earlier, the assignment may be determined using different metrics, as for example:

1. Convex Sum of Signal-to-Interference-plus-Noise Ratio (CS-SINR): It is based on the convex sum of SINRs for both cellular and D2D communications and is given by $$\varphi_{CS-SINR} = (1-\alpha)\frac{\text{cell gain}}{d2d \text{ leakage}} + \alpha\frac{d2d \text{ gain}}{\text{cell leakage}} \quad \text{(Equation 2)}$$

where $\alpha$ is a constant factor between 0 and 1, and the leakage is seen as the generated interference power. This metric makes differentiation among transmitters and receivers using all four received power information(s) of channel links among a cellular UE and a D2D pair to measure how good is the geographical separation of them to share resources. As desired and interfering cellular links are assumed to be known at the eNB and the desired D2D link is assumed to be known by the D2D users, only interfering links at the cellular terminal in DL and at the D2D terminal in UL are difficult to obtain. Herein, the reference minimum power used by the D2D discovery procedure could be used instead. Another possibility is to use a mechanism to estimate the unknown interfering link.

2. Convex Sum of Signal-to-Leakage Ratio (CS-SLR): It is based on the convex sum of the ratio between the desired signal power over the undesired leakage of the transmitter for both cellular and D2D communications and is given by $$\varphi_{CS-SLR} = (1-\alpha)\frac{\text{cell gain}}{\text{cell leakage}} + \alpha\frac{d2d \text{ gain}}{d2d \text{ leakage}} \quad \text{(Equation 3)}$$

One motivation for the choice of the signal-to-leakage ratio instead of the signal-to-interference ratio is that it is independent of an estimate for the transmit power, which is difficult to obtain in the scheduling step when power control mechanisms are employed.

Other examples of assignment metrics are cited in Chapter 2: Device-to-Device User Equipment Grouping for Interference Minimization of reference R. L. Batista, C. F. M. e Silva, J. M. B. da Silva Jr., T. F. Maciel, and F. R. P. Cavalcanti, "Network-Assisted Device-to-Device Communications," GTEL-UFC-Ericsson UFC.33, Tech. Rep., August 2013, Second Technical Report. They are employed for only a primary cellular wireless device, but they also can make the assignment for each cellular wireless device considered by the assignment step.

Joint Scheduling

To achieve a high multiuser diversity gain, the joint scheduling step is based on the PF policy. Its scheduling metric makes a joint processing of instantaneous link conditions of both cellular and D2D links to improve opportunistically their total throughput. The joint scheduling metric is based on the same priority calculation as performed to obtain the PF-ratio, which considers instantaneous and average historical throughputs. However, the instantaneous cellular throughput is modified to the total instantaneous throughput of a cellular UE and a D2D pair, which is given by $$T_{TOT}^{CELL+D2D} = T_{CELL}^{CELL+D2D} + T_{D2D}^{CELL+D2D}, \quad \text{(Equation 4)}$$

where $T_{CELL}$ is the instantaneous cellular throughput and $T_{D2D}$ is the instantaneous throughput of a D2D link. Thus, the priority of each group u is calculated as follows $$P_u^{CELL+D2D} = \frac{(T_{TOT}^{CELL+D2D})^\beta}{(R_{CELL}^{CELL+D2D})^\gamma}, \quad \text{(Equation 5)}$$

where $R_{CELL}$ is the historical average data rate, and $\beta$ and $\gamma$ tune the "fairness" such as in the standard PF-ratio. The instantaneous throughput of the PF scheduling policy in a cellular network is based on the estimated SINR, in which the interference power is only due to transmissions in other cells, and both instantaneous and historical average data rates for each cellular UE are supposed to be known by the scheduling policy. In its turn, instantaneous SINR values estimated by the joint scheduling shall consider also the intra-cell interference due to reuse with a D2D link within the cell.

Let $P_u^{CELL}$ denote the priority of a cellular wireless device u without any presence of a D2D communication in its cell and $P_u^{CELL+D2D}$ its priority considering the D2D pair set by the assignment step. Also, let us consider that Cell mode represents the standard cellular scheduling without any presence of a D2D communication into a cell and Cell+D2D mode indicates that a cellular wireless device will share the same time-frequency resource with the D2D pair defined by the assignment step. $P_u^{CELL}$ may be exemplified by the standard PF-ratio. For each scheduling instance, the best cellular wireless device u* to be scheduled and its mode is given by $$\langle u* \mid \text{mode} \rangle = \arg\max \begin{bmatrix} P_1^{CELL} & P_1^{CELL+D2D} \\ P_1^{CELL} & P_1^{CELL+D2D} \\ \vdots & \vdots \\ P_J^{CELL} & P_J^{CELL+D2D} \end{bmatrix}. \quad \text{(Equation 6)}$$

For this metric, referred to as "respective priority" in action 405, each radio resource is mandatorily allocated to at least one cellular wireless device while its sharing with a D2D pair depends on the priority and spatial compatibility between them. Thus, it has the flexibility of avoid scheduling D2D communications in situations in which they do not provide total instantaneous data rate gains, performing thus mode selection. Herein, cellular wireless devices near to hotspot zones do not tend to be chosen by the joint scheduling to use the Cell+D2D mode because of a low total instantaneous throughput. As only the total instantaneous data rate includes the D2D throughput and cellular wireless devices compete for resources based on the PF-ratio, the fairness given by the historical average throughput is still provided such as by the standard PF-ratio. Herein, cellular wireless devices in favorable conditions have their instantaneous throughputs reduced due to the addition of the intra-cell interference. Thus, these wireless devices will still have high priority to be scheduled in subsequent scheduling rounds because of a slow increasing on the historical throughput. In fact, the joint scheduling is effective in favoring groups with a high multiuser gain.

Protection Mechanism

The protection mechanism is designed to prevent impacts on cellular communications since the total throughput sometimes can hide a low cellular throughput because a high D2D gain. It aims to ensure a minimum throughput requirement for cellular communications by limiting interference from D2D pairs. When the reduction on the instantaneous throughput of a cellular wireless device due to interference of its assigned D2D pair is higher than the maximum allowable one, the joint scheduling shall avoid choosing this D2D pair, but the cellular wireless device shall still be available to be chosen. Let $f_u$ (%) denote the effective percentage throughput loss of a cellular wireless device u due to impact of a D2D communication, which is given by $$f_u = 1 - \frac{T_{CELL}^{CELL+D2D}}{T_{CELL}^{CELL}}, \quad \text{(Equation 7)}$$

where $T_{CELL}^{CELL}$ is the instantaneous data rate of the cellular wireless device u when it is not sharing resources with the assigned D2D pair and $T_{CELL}^{CELL+D2D}$ when it is. In order to control the impact on performance of cellular communications, this mechanism switches off a candidate group using a reversed step function to nullify its total throughput as follows $$T_{TOT}^{CELL+D2D} = \begin{cases} 0, & \text{if } f_u > F_P, \\ T_{TOT}^{CELL+D2D}, & \text{otherwise,} \end{cases} \quad \text{(Equation 8)}$$

where $F_P$ (%) denotes the maximum allowable percentage loss for the throughput of a cellular communication that is admissible in the presence of a D2D communication. When the total instantaneous throughput is nullified, its PF-ratio is also nullified and thus the Cellular and D2D mode (Cell+D2D) is avoided.

Pre-assignment and Pre-scheduling

Pre-assignment and pre-scheduling are applied to reduce the complexity of the JOAS algorithm. Pre-assignment and pre-scheduling pick up the most likely cellular wireless devices and D2D pairs to be scheduled if a full wide-search joint scheduling was used. The number of cellular wireless devices and D2D pairs is directly connected to the reduction on complexity of the algorithm. Herein, pre-assignment and pre-scheduling do not need to be applied together. In the following, both pre-assignment and pre-scheduling are detailed:

1. Pre-assignment: It reduces the complexity of the assignment step by allowing assignments of D2D pairs only to most likely cellular wireless devices to be scheduled. The assignment step is dealt only to a certain fraction of the total cellular UEs within each cell. Herein, the assignment of D2D pairs is performed for $F_A$ (%) of cellular UEs which have the highest PF ratio values without any presence of D2D communications. $F_A$ (%) is referred to as "the portion" in conjunction with FIG. 4.

2. Pre-scheduling: It reduces the complexity of the scheduling step by allowing scheduling only to most spatially compatible groups of D2D pairs. The pre-scheduling will refine the selections made by the pre-assignment. Herein, the total throughput calculations of the scheduling step are dealt to $F_S$ (%) of cellular UEs with its corresponding D2D pairs which have the highest assignment metric values. $F_S$ (%) is referred to as "the further portion" in conjunction with FIG. 4.

Multiple-layer Scheduling

The multiple-layer scheduling step is designed to group multiple D2D pairs in a cell. Since possible combinations of groups of multiple D2D pairs can be as higher as the number of D2D pairs, the general problem involving multiple layers is a complex problem. In fact, there is a trade-off between capacity and complexity being governed by the number of layers. Besides complexity issue, it has been shown in R. L. Batista, C. F. M. e Silva, J. M. B. da Silva Jr., T. F. Maciel, and F. R. P. Cavalcanti, "Network-Assisted Device-to-Device Communications," GTEL-UFC-Ericsson UFC.33, Tech. Rep., August 2013, Second Technical Report, that the total throughput is always reduced as higher is the number of multiple D2D pairs in a cell considering the micro environment, which is due to increased co-channel interference. In fact, even the gain with only one D2D pair is strongly dependent of favorable scenarios as mentioned in the background section. Since the probability of multiple-layer gain is low but the complexity processing is high, the choice of the joint scheduling to providing an initial group with the cellular wireless device u* and D2D pair $n_u$ is designed previously to a greedy search to limit the number of multiple D2D pairs to be evaluated among all possible combinations. Thus, the complexity is so higher as are the potential total throughput gains to each layer of multiple D2D pairs.

The multiple-layer scheduling is divided in three steps: Multiple-layer assignment, protection mechanism and greedy scheduling steps. The protection mechanism has the same operation detailed in section "Protection mechanism" above.

1. Multiple-layer assignment: When one D2D pair is grouped by the joint scheduling, the multiple-layer scheduling starts testing layers from the 2nd layer, i.e., 1=2. Thus, for each layer 1 of multiple D2D pairs, all available $N_1$ D2D pairs within a cell are combined in $N_1$ groups with 1 D2D pairs. Herein, the assignment metrics defined in (2) and (3) need be extended to measure the spatial compatibility of a group involving multiple D2D pairs and the already scheduled cellular wireless device. Then, a vector for the assignment metric $\varphi_{u^*,n}$ among the cellular wireless device u* and the $N_1$ candidate groups, which is similar to the matrix defined in (1), is given by $\Phi=[\varphi_{u^*,1} \; \varphi_{u^*,2} \ldots \varphi_{u^*,N_1}]$. Hence, the group $n_u$ maximizing the assignment metric is given by $n_u$=arg max $\varphi_{u^*,n}$.

2. Greedy scheduling: Thus, similarly to equation (4), the total instantaneous throughput is recalculated for each evaluated layer 1 as $$T_{TOT}^{CELL+D2D} = T_{CELL}^{CELL+D2D} + \sum_{l=1}^{N_1} T_{D2D}^{CELL+D2D}$$

and while total instantaneous throughput gains are possible the number of layers is increased, that is, the multiple D2D pairs in the group.

These embodiments take into account further benefits of the multiuser diversity with respect to a complex multiple-layer problem by scheduling multiple D2D pairs through a simple greedy approach in each cell, Physical Resource Block (PRB) and TTI.

Figure 6:
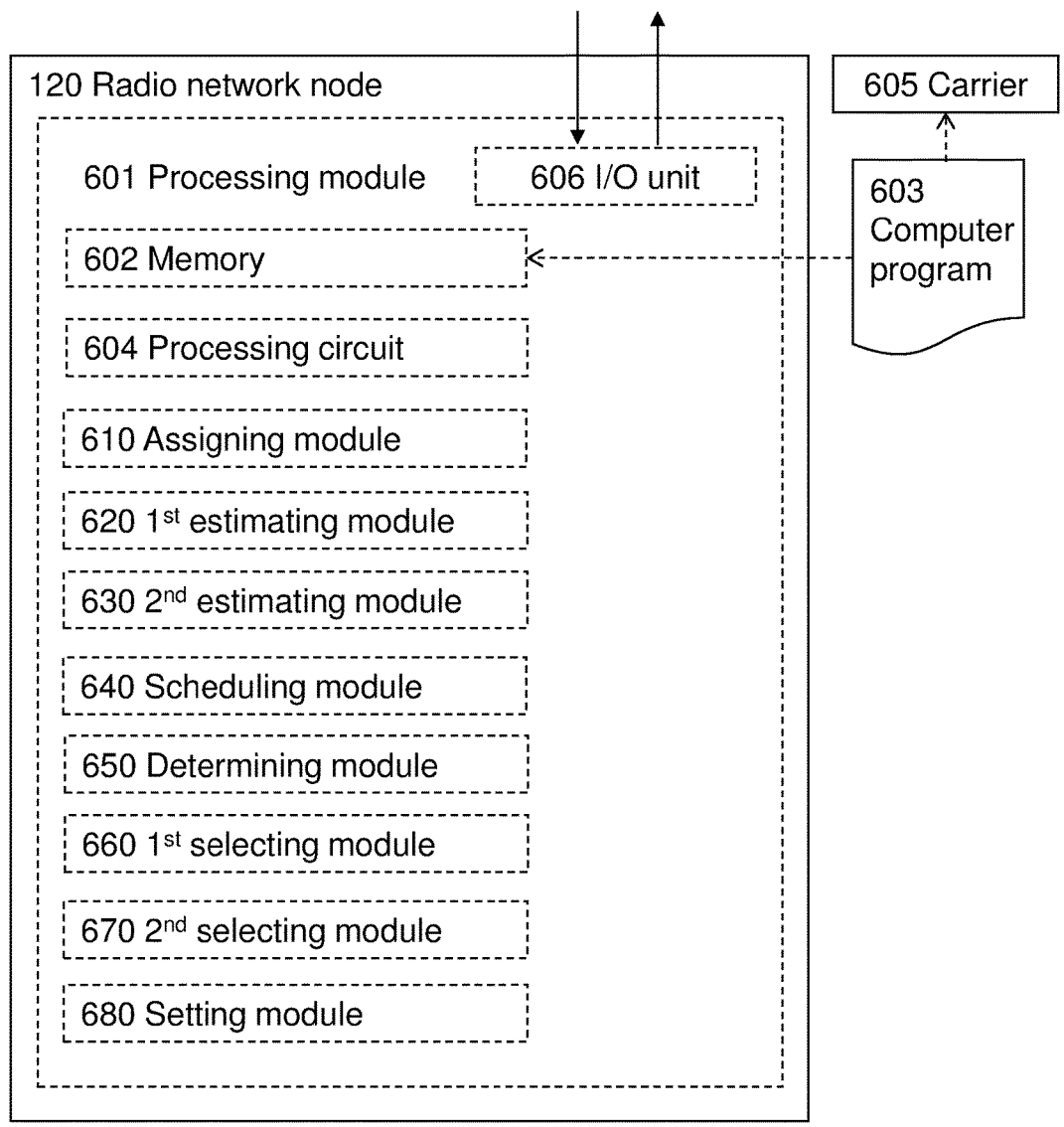
FIG. 6 is a block diagram illustrating embodiments of the wireless device.

With reference to FIG. 6, a schematic block diagram of embodiments of the radio network node 120 of FIG. 1 is shown. The radio network node 120 is thus configured to schedule wireless devices 110, 111, 112, 113 of a cellular network 100, wherein at least some of the wireless devices 110, 111, 112, 113 form D2D pairs 115, 116. Wireless devices 110, 111, 112, 113 of each D2D pair 115, 116 are operable for direct communication utilizing radio resources that are commonly shared with the cellular network 100.

The radio network node 120 may comprise a processing module 601, such as a means, one or more hardware modules and/or one or more software modules for performing the methods described herein.

The radio network node 120 may further comprise a memory 602. The memory may comprise, such as contain or store, a computer program 603.

According to some embodiments herein, the processing module 601 comprises, e.g. 'is embodied in the form of' or 'realized by', a processing circuit 604 as an exemplifying hardware module. In these embodiments, the memory 602 may comprise the computer program 603, comprising computer readable code units executable by the processing circuit 604, whereby the radio network node 120 is operative to perform the methods of FIG. 2 and/or FIG. 5.

In some other embodiments, the computer readable code units may cause the radio network node 120 to perform the method according to FIGS. 2 and/or 5 when the computer readable code units are executed by the radio network node 120.

FIG. 6 further illustrates a carrier 605, comprising the computer program 603 as described directly above. The carrier 605 may be one of an electronic signal, an optical signal, a radio signal, and a computer readable medium.

In some embodiments, the processing module 601 comprises an Input/Output unit 606, which may be exemplified by a receiving module and/or a sending module as described below when applicable.

In further embodiments, the processing module 601 may comprise one or more of an assigning module 610, a firsts estimating module 620, a second estimating module 630, a scheduling module 640, a determining module 650, a first selecting module 660, a second selecting module 670 and a setting module 680 as exemplifying hardware modules. In other examples, one or more of the aforementioned exemplifying hardware modules may be implemented as one or more software modules.

Therefore, according to the various embodiments described above, the radio network node 120 is operative to and/or the radio network node 120, the processing module 601 and/or the assigning module 610 is configured to assign, to each wireless device 110, 111, 112, 113, a D2D pair out of the D2D pairs 115, 116 based on spatial compatibilities for each of the D2D pairs 115, 116 with respect to said each wireless device 110, 111, 112, 113.

As mentioned, the spatial compatibility may be measured in terms of one of more of:
a link quality measure relating to cellular communication and D2D communication;
a level of interference between cellular communication and D2D communication;
a signal-to-interference-ratio for cellular and D2D communication;
a signal-to-leakage-ratio for cellular and D2D communication; and the like.

The radio network node 120 is operative to and/or the radio network node 120, the processing module 601 and/or the first estimating module 620 is configured to estimate, for each wireless device 110, 111, 112, 113 and the assigned D2D pair 115, 116, a first respective throughput for cellular communication and D2D communication.

The radio network node 120 is operative to and/or the radio network node 120, the processing module 601 and/or the second estimating module 630 is configured to estimate, for each wireless device 110, 111, 112, 113, a second respective throughput for only cellular communication.

In some examples, the first and second estimating modules 620, 630 may be comprised in an estimating module configured to perform e.g. action 403 and 404.

Furthermore, the radio network node 120 is operative to and/or the radio network node 120, the processing module 601 and/or the scheduling module 640 is configured to schedule one or more of the wireless devices 110, 111, 112, 113 based on the first and second respective throughputs, wherein each of the one or more of the wireless devices 110, 111, 112, 113 is scheduled for cellular communication together with the D2D communication of the assigned D2D pair 115, 116 when the first respective throughput exceeds the second respective throughput, and for only cellular communication when the first respective throughput is below the second respective throughput.

The radio network node 120 may be operative to and/or the radio network node 120, the processing module 601 and/or the determining module 650 may be configured to determine, for each wireless device 110, 111, 112, 113, a respective priority for scheduling of said each wireless device 110, 111, 112, 113 based on the first and second respective throughputs.

The radio network node 120 may be operative to and/or the radio network node 120, the processing module 601 and/or the second selecting module 670 may be configured to select the one or more wireless devices 110, 111, 112, 113 based on the respective priority for each wireless device 110, 111, 112, 113.

In some embodiments, a respective assignment metric represents the spatial compatibility for a respective one of the wireless devices 110, 111, 112, 113. In these embodiments, the radio network node 120 may be configured to perform the determining of the respective priority only for a further portion of groups comprising the wireless devices 110, 111, 112, 113 with their respective assigned D2D pair 115, 116, wherein the respective assignment metric for each group of the further portion may be greater than any corresponding respective assignment metric for any one of the wireless devices 110, 111, 112, 113 with their respective assigned D2D pair 115, 116, which may be excluded from the further portion.

The radio network node 120 may be operative to and/or the radio network node 120, the processing module 601 and/or the first selecting module 660 may be configured to select the D2D pair 115, 116 for which a respective spatial compatibility for said each wireless device 110, 111, 112, 113 is among the greatest of the spatial compatibilities to be assigned to said each wireless device 110, 111, 112, 113.

The radio network node 120 may be operative to and/or the radio network node 120, the processing module 601 and/or the setting module 680 may be configured to set the first throughput to zero when one minus a ratio between the first respective throughput and the second respective throughput exceed a threshold for protection of the cellular communication.

The radio network node 120 may be operative to and/or the radio network node 120 and/or the processing module 601 may be configured to perform the assigning 401 of the respective one of the D2D pairs 115, 116 only for a portion of the wireless devices 110, 111, 112, 113 operated in cellular communication, wherein each of the wireless devices 110, 111, 112, 113 of the portion has a respective proportionally-fair PF ratio based on the second respective throughput that is greater than any corresponding PF ratio for any one of the wireless devices 110, 111, 112, 113 which is excluded from the portion.

The radio network node 120 may be operative to and/or the radio network node 120 and/or the processing module 601 may be configured to perform one or more of the estimation of the first respective throughput, the estimation of the second respective throughput and the scheduling 407 for each scheduling instance, wherein said each scheduling instance relates to one or more of a TTI, radio resources comprised in the cellular network 100, a frequency selected for scheduling; and the like.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "processing circuit" may refer to a processing unit, a processor, an Application Specific integrated Circuit (ASIC), a Field-Programmable Gate Array (FPGA) or the like. The processing circuit or the like may comprise one or more processor kernels.

As used herein, the expression "configured to" may mean that a processing circuit is configured to, or adapted to, by means of software configuration and/or hardware configuration, perform one or more of the actions described herein.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), etc.

As used herein, the term "computer readable code units" may be text of a computer program, parts of or an entire binary file representing a computer program in a compiled format or anything there between.

As used herein, the term "radio resource" may refer to a certain coding of a signal and/or a time frame and/or a frequency range in which the signal is transmitted. In some examples, a resource may refer to one or more Physical Resource Blocks (PRB) which is used when transmitting the signal. In more detail, a PRB may be in the form of Orthogonal Frequency Division Multiplexing (OFDM) PHY resource blocks (PRB). The term "physical resource block" is known from 3GPP terminology relating to e.g. Long Term Evolution Systems.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a bit string.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a radio network node, for scheduling of wireless devices of a cellular network, at least two of the wireless devices forming Device-to-Device (D2D) pairs, the wireless devices of each D2D pair being configured for direct communication utilizing radio resources that are commonly shared with the cellular network, the method comprising:
   assigning, to each wireless device, a D2D pair out of the D2D pairs based on spatial compatibilities for each of the D2D pairs with respect to said each wireless device;
   estimating, for each wireless device and the assigned D2D pair, a first respective throughput for cellular communication and D2D communication;
   estimating, for each wireless device, a second respective throughput for only cellular communication;
   scheduling at least one of the wireless devices based on the first and second respective throughputs, each of the at least one wireless device is scheduled for cellular communication together with the D2D communication of the assigned D2D pair when the first respective throughput exceeds the second respective throughput, and for only cellular communication when the first respective throughput is below the second respective throughput; and
   determining, for each wireless device, a respective priority for scheduling of said each wireless device based on the first and second respective throughputs, wherein the scheduling of the at least one wireless device comprises:
   selecting the at least one wireless device based on the respective priority for each wireless device,
   wherein the determining of the respective priority comprises:
   setting the first throughput to zero when one minus a ratio between the first respective throughput and the second respective throughput exceed a threshold for protection of the cellular communication.

2. The method of claim 1, wherein the assigning of the D2D pair comprises:
   selecting the D2D pair for which a respective spatial compatibility for said each wireless device is among the greatest of the spatial compatibilities to be assigned to said each wireless device.

3. The method of claim 2, wherein a respective assignment metric represents the spatial compatibility for a respective one of the wireless devices, wherein the determining of the respective priority is performed only for a further portion of groups comprising the wireless devices with their respective assigned D2D pair, and wherein the respective assignment metric for each group of the further portion is greater than any corresponding respective assignment metric for any one of the wireless devices with their respective assigned D2D pair, which is excluded from the further portion.

4. The method of claim 1, wherein the assigning of the respective one of the D2D pairs is performed only for a portion of the wireless devices operated in cellular communication, wherein each of the wireless devices of the portion has a respective proportionally-fair (PF) ratio based on the second respective throughput that is greater than any corresponding PF ratio for any one of the wireless devices which is excluded from the portion.

5. The method of claim 1, wherein a respective assignment metric represents the spatial compatibility for a respective one of the wireless devices, wherein the determining of the respective priority is performed only for a further portion of groups comprising the wireless devices with their respective assigned D2D pair, and wherein the respective assignment metric for each group of the further portion is greater than any corresponding respective assignment metric for any one of the wireless devices with their respective assigned D2D pair, which is excluded from the further portion.

6. The method of claim 1, wherein the spatial compatibility is measured based on at least one of:
   a link quality measure relating to cellular communication and D2D communication;
   a level of interference between cellular communication and D2D communication;
   a signal-to-interference-ratio for cellular and D2D communication; and
   a signal-to-leakage-ratio for cellular and D2D communication.

7. The method of claim 1, wherein at least one of the group consisting of the estimation of the first respective throughput, the estimation of the second respective throughput and the scheduling is performed for each scheduling instance, wherein said each scheduling instance relates to at least one of:
   a Transmission Timing Interval;
   radio resources comprised in the cellular network; and
   a frequency selected for scheduling.

8. The method of claim 1, wherein the assigning of the respective one of the D2D pairs is performed only for a portion of the wireless devices operated in cellular communication, wherein each of the wireless devices of the portion has a respective proportionally-fair (PF) ratio based on the second respective throughput that is greater than any corresponding PF ratio for any one of the wireless devices which is excluded from the portion.

9. A radio network node configured to schedule wireless devices of a cellular network, at least two of the wireless devices forming Device-to-Device (D2D) pairs, the wireless devices of each D2D pair being configured for direct communication utilizing radio resources that are commonly shared with the cellular network, wherein the radio network node is configured to: assign, to each wireless device, a D2D pair out of the D2D pairs based on spatial compatibilities for each of the D2D pairs with respect to said each wireless device; estimate, for each wireless device and the assigned D2D pair, a first respective throughput for cellular communication and D2D communication; and estimate, for each wireless device, a second respective throughput for only cellular communication; schedule at least one of the wireless devices based on the first and second respective throughputs, each of the at least one wireless device is scheduled for cellular communication together with the D2D communication of the assigned D2D pair when the first respective throughput exceeds the second respective throughput, and for only cellular communication when the first respective throughput is below the second respective throughput;

and determine, for each wireless device, a respective priority for scheduling of said each wireless device based on the first and second respective throughputs, wherein the scheduling of the at least one wireless device comprises: selecting the at least one wireless device based on the respective priority for each wireless device, wherein the determining of the respective priority comprises: setting the first throughput to zero when one minus a ratio between the first respective throughput and the second respective throughput exceed a threshold for protection of the cellular communication.

10. The radio network node of claim 9, wherein the radio network node is further configured to:
 determine, for each wireless device, a respective priority for scheduling of said each wireless device based on the first and second respective throughputs; and
 select the at least one wireless device based on the respective priority for each wireless device.

11. The radio network node claim 10, wherein the radio network node is configured to perform the assigning of the respective one of the D2D pairs only for a portion of the wireless devices operated in cellular communication, wherein each of the wireless devices of the portion has a respective proportionally-fair (PF) ratio based on the second respective throughput that is greater than any corresponding PF ratio for any one of the wireless devices which is excluded from the portion.

12. The radio network node of claim 9, wherein the radio network node is configured to perform the assigning of the respective one of the D2D pairs only for a portion of the wireless devices operated in cellular communication, wherein each of the wireless devices of the portion has a respective proportionally-fair (PF) ratio based on the second respective throughput that is greater than any corresponding PF ratio for any one of the wireless devices which is excluded from the portion.

13. A non-transitory computer storage medium storing computer readable code which when executed by a processor of a radio network node causes the radio network node to perform a method for scheduling of wireless devices of a cellular network, at least two of the wireless devices forming Device-to-Device (D2D) pairs, the wireless devices of each D2D pair being configured for direct communication utilizing radio resources that are commonly shared with the cellular network, the method comprising:
 assigning, to each wireless device, a D2D pair out of the D2D pairs based on spatial compatibilities for each of the D2D pairs with respect to said each wireless device;
 estimating, for each wireless device and the assigned D2D pair, a first respective throughput for cellular communication and D2D communication;
 estimating, for each wireless device, a second respective throughput for only cellular communication;
 scheduling at least one of the wireless devices based on the first and second respective throughputs, each of the at least one wireless device is scheduled for cellular communication together with the D2D communication of the assigned D2D pair when the first respective throughput exceeds the second respective throughput, and for only cellular communication when the first respective throughput is below the second respective throughput; and
 determining, for each wireless device, a respective priority for scheduling of said each wireless device based on the first and second respective throughputs, wherein the scheduling of the at least one wireless device comprises:
 selecting the at least one wireless device based on the respective priority for each wireless device,
 wherein the determining of the respective priority comprises:
 setting the first throughput to zero when one minus a ratio between the first respective throughput and the second respective throughput exceed a threshold for protection of the cellular communication.

* * * * *